(No Model.)
T. CASCADEN, Jr.
FEED GRINDER.
No. 525,976. Patented Sept. 11, 1894.
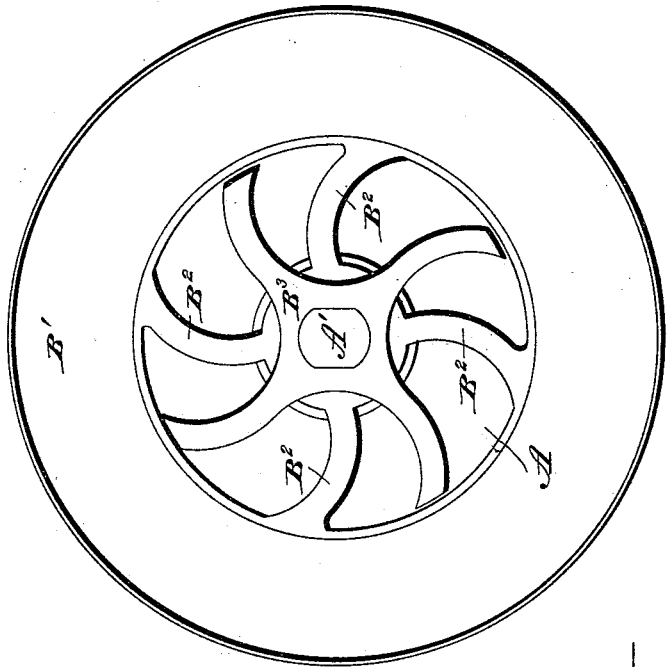
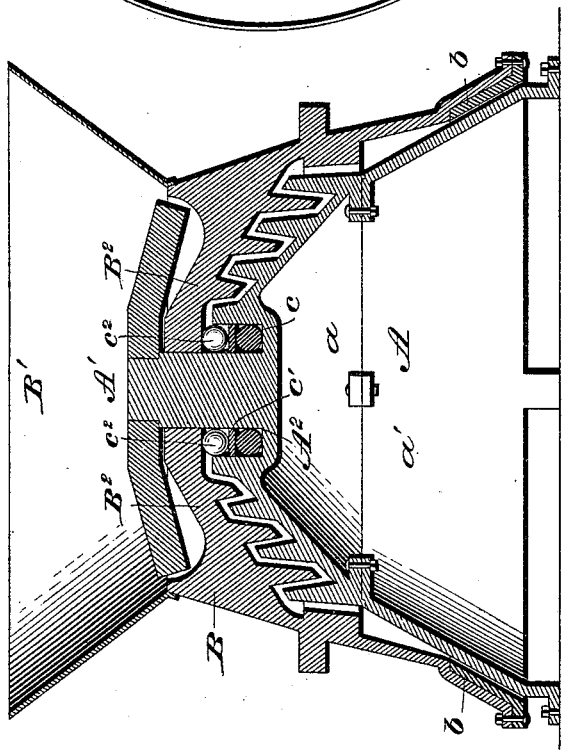
Witnesses
G. S. Elliott
T. W. Johnson
Thomas Cascaden, Jr.,
Inventor
By his Attorney

UNITED STATES PATENT OFFICE.

THOMAS CASCADEN, JR., OF WATERLOO, IOWA.

FEED-GRINDER.

SPECIFICATION forming part of Letters Patent No. 525,976, dated September 11, 1894.

Application filed May 24, 1894. Serial No. 512,292. (No model.)

*To all whom it may concern:*

Be it known that I, THOMAS CASCADEN, Jr., a citizen of the United States of America, residing at Waterloo, in the county of Black Hawk and State of Iowa, have invented certain new and useful Improvements in Feed-Grinders; and I do hereby declare the following to be a full, clear, and exact description of the invention, such as will enable others skilled in the art to which it appertains to make and use the same, reference being had to the accompanying drawings, and to letters of reference marked thereon, which form a part of this specification.

The object of this invention is to provide a support for the outer grinding shell of a feed grinder which will permit it to move to and from the inner shell or cone and at all times hold it out of contact therewith; and the invention consists in providing the inner shell or cone with a recess to receive a rubber packing or ring above which is located a metal disk and balls which serve as bearings to support the outer grinding shell, as will be hereinafter fully set forth and particularly pointed out in the claims.

In the accompanying drawings, Figure 1 is a sectional view of a grinding mill of ordinary construction, showing my improvements applied thereto, and Fig. 2 is a plan view.

A designates the inner shell or cone of the grinding mill which is of ordinary construction, being preferably made up of two parts $a$ and $a'$ which are bolted to each other, the part $a'$ forming the base which is supported upon the receiving box and secured thereto by bolts or screws. From the upper part of the inner shell or cone projects the stem $A'$ surrounded by a recess $A^2$ which receives the bearing hereinafter described.

B designates the outer grinding shell to which the sweep is attached in the usual manner. The outer shell also supports the hopper $B'$. The part of the outer grinding shell immediately above the recess $A^2$ in the inner shell or cone is hardened to provide a bearing surface, and the grinding surfaces of the shells are also hardened, the outer shell being provided with a removable grinding ring $b$ as shown. The upper part of the outer grinding shell is provided with arms $B^2$ between which the material to be ground passes, and keyed to the upper end of the stem $A'$ is a plate $B^3$ having projecting arms which serve as stirrers to prevent material clogging in the hopper, it being understood that the hopper and outer grinding shell turn together.

In the base of the recess $A^2$ in the inner shell or cone is placed a rubber ring $c$, which is preferably round in cross section, though any other configuration may be used which will provide for the expansion of the ring within the recess. Above the rubber ring is placed an annular plate of steel, $c'$, and a suitable number of steel balls $c^2$, the metal plate forming the lower bearing for the balls upon which bears the outer shell of the grinding mill. The outer shell fits snugly upon the stem and an undue upward movement thereon is prevented by the plate $B^3$. This construction permits the outer grinding shell to have a slight vertical movement.

A grinding mill constructed as hereinbefore described will run easily and will prevent the two grinding surfaces coming in contact with each other, and by the use of the particular bearing I preserve all the advantages of a ball or roller bearing and a movable support without radically changing the construction of the mill.

Having thus described my invention, what I claim as new, and desire to secure by Letters Patent, is—

1. In a grinding mill, the combination, of an inner shell or cone having a stem surrounded by a recess and an outer grinding shell adapted to fit upon the stem, together with an elastic packing located in the base portion of the recess, a metal plate placed over said packing and balls placed upon the metal plate, the outer grinding shell bearing upon the balls, substantially as shown and for the purpose set forth.

2. In a grinding mill, the combination, of an inner cone and outer grinding shell, an elastic packing, a metal ring, and rollers, arranged as shown so as to provide an anti-friction bearing and permit the grinding surfaces to move toward each other.

In testimony whereof I affix my signature in presence of two witnesses.

THOMAS CASCADEN, JR.

Witnesses:
W. C. LOGAN,
IRA RODAMAR.